US011494766B2

(12) United States Patent
Fang et al.

(10) Patent No.: US 11,494,766 B2
(45) Date of Patent: Nov. 8, 2022

(54) MANAGING TRANSACTIONS ON BLOCKCHAIN NETWORKS

(71) Applicant: Advanced New Technologies Co., Ltd., Grand Cayman (KY)

(72) Inventors: Hui Fang, Hangzhou (CN); Yuan Yuan, Hangzhou (CN); Shengjiao Cao, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 60 days.

(21) Appl. No.: 16/792,028

(22) Filed: Feb. 14, 2020

(65) Prior Publication Data

US 2020/0184473 A1 Jun. 11, 2020

(30) Foreign Application Priority Data

Jul. 23, 2019 (SG) .............................. 10201906799P

(51) Int. Cl.
*G06Q 20/40* (2012.01)
*H04L 9/32* (2006.01)
(Continued)

(52) U.S. Cl.
CPC ......... *G06Q 20/401* (2013.01); *G06Q 20/023* (2013.01); *G06Q 20/29* (2013.01);
(Continued)

(58) Field of Classification Search
CPC .. G06Q 20/401; G06Q 20/023; G06Q 20/389; G06Q 20/29; H04L 9/3236; H04L 9/3297; H04L 9/50
See application file for complete search history.

(56) References Cited

U.S. PATENT DOCUMENTS 9,824,031 B1 * 11/2017 Ganti .................... H04L 9/3236
10,102,265 B1 * 10/2018 Madisetti ........... G06Q 20/0658
(Continued)

FOREIGN PATENT DOCUMENTS

CN 105630609 6/2016
CN 107018125 A * 8/2017 ........... H04L 9/3239
(Continued)

OTHER PUBLICATIONS

Ron White, How Computers Work, 7th edition (Year: 2003).*
(Continued)

*Primary Examiner* — John W Hayes
*Assistant Examiner* — Taylor S Rak
(74) *Attorney, Agent, or Firm* — Fish & Richardson P.C.

(57) ABSTRACT

Disclosed herein are computer-implemented methods, computer-implemented systems, and non-transitory, computer-readable media for managing transactions on blockchain networks. One of computer-implemented method includes obtaining, by a scheduling device on a blockchain network, transaction data including a plurality of original pending transactions to be executed on the blockchain network among a plurality of accounts, the transaction data being stored on the blockchain network. The scheduling device performs a consolidation analysis of the plurality of original pending transactions to determine a plurality of modified pending transactions among the plurality of accounts, and a number of the plurality of modified pending transactions is less than a number of the plurality of original pending transactions. The scheduling device maintains the plurality of original pending transactions with the plurality of modified pending transactions, without updating the transaction data stored on the blockchain network with the plurality of modified pending transactions.

29 Claims, 7 Drawing Sheets

(51) Int. Cl.
*G06Q 20/38* (2012.01)
*G06Q 20/02* (2012.01)
*H04L 9/00* (2022.01)
*G06Q 20/22* (2012.01)

(52) U.S. Cl.
CPC ......... *G06Q 20/389* (2013.01); *H04L 9/3236* (2013.01); *H04L 9/3297* (2013.01); *H04L 9/50* (2022.05)

(56) References Cited

U.S. PATENT DOCUMENTS

| | | | | |
|---|---|---|---|---|
| 2006/0218651 | A1* | 9/2006 | Ginter | H04N 21/2543 726/27 |
| 2008/0010215 | A1* | 1/2008 | Rackley, III | G06Q 20/385 705/70 |
| 2010/0169137 | A1* | 7/2010 | Jastrebski | G06T 11/206 715/215 |
| 2013/0054417 | A1 | 2/2013 | O'Donoghue et al. | |
| 2017/0243215 | A1 | 8/2017 | Sifford et al. | |
| 2018/0101848 | A1 | 4/2018 | Castagna et al. | |
| 2019/0018887 | A1 | 1/2019 | Madisetti et al. | |
| 2020/0028697 | A1* | 1/2020 | Unger | H04L 63/101 |

FOREIGN PATENT DOCUMENTS

| | | |
|---|---|---|
| CN | 108520412 | 9/2018 |
| CN | 108537522 | 9/2018 |
| CN | 108805560 | 11/2018 |
| CN | 108932348 | 12/2018 |
| CN | 109360101 | 2/2019 |
| CN | 109660601 | 4/2019 |
| CN | 110009316 | 7/2019 |
| CN | 110264348 | 9/2019 |
| WO | WO 2019120333 | 6/2019 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Harding, "Saving up to 80% on Bitcoin transaction fees by batching payments," Medium, Bitcoin Tech Talk, retrieved from URL <https://bitcointechtalk.com/saving-up-to-80-on-bitcoin-transaction-fees-by-batching-payments-4147ab7009fb>, Aug. 30, 2017, 8 pages.

Nakamoto, "Bitcoin: A Peer-to-Peer Electronic Cash System," www.bitcoin.org, 2005, 9 pages.

Gazda et al., "An Application of graph theory in the process of mutual debt compensation" Acta Polytechnica Hungarica, 2015,12(2): 7-25.

PCT International Search Report and Written Opinion in International Application No. PCT/CN2020/099400, dated Oct. 13, 2020, 8 pages.

Sofo et al., "Application of Ant Colony Optimisation on Debt Cancelation Problem", Recent Advances in Information Science, 2013, pp. 310-315.

\* cited by examiner

MANAGING TRANSACTIONS ON BLOCKCHAIN NETWORKS

CROSS-REFERENCE TO RELATED APPLICATIONS

This application is a continuation of Singapore Application No. 10201906799P, filed on Jul. 23, 2019, which is hereby incorporated by reference in its entirety.

TECHNICAL FIELD

This specification relates to managing transactions on blockchain networks.

BACKGROUND

Distributed ledger systems (DLSs), which can also be referred to as consensus networks, and/or blockchain networks, enable participating entities to securely, and immutably store data. DLSs are commonly referred to as blockchain networks without referencing any particular user case. Examples of types of blockchain networks can include public blockchain networks, private blockchain networks, and consortium blockchain networks. A consortium blockchain network is provided for a select group of entities, which control the consensus process, and includes an access control layer.

In a peer-to-peer distributed network, users make transactions between each other. The transactions are usually stored in a distributed ledger of the network. In some cases, the number of transactions can be accumulated to be such a large volume that the whole network performance is impacted, together with increasingly required storage space.

Therefore, it would be desirable to effectively and securely managing transactions among users on blockchain networks.

SUMMARY

This specification describes technologies for managing transactions on blockchain networks. These technologies generally involve managing transactions among users on a blockchain network by a scheduler node on the blockchain network. The scheduler node can perform a consolidation analysis on original pending transactions to generate a less number of modified pending transactions and send modified pending transactions associated with particular users to a settlement account management (SAM) server for settlement (or execution). The technologies can help reducing the number of actual settlement transactions such that the blockchain network can process a large volume of transactions while using blockchain technology to provide trust to every user and integrity to each transaction.

This specification also provides one or more non-transitory computer-readable storage media coupled to one or more processors and having instructions stored thereon which, when executed by the one or more processors, cause the one or more processors to perform operations in accordance with embodiments of the methods provided herein.

This specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with embodiments of the methods provided herein.

It is appreciated that methods in accordance with this specification may include any combination of the aspects and features described herein. That is, methods in accordance with this specification are not limited to the combinations of aspects and features specifically described herein, but also include any combination of the aspects and features provided.

The details of one or more embodiments of this specification are set forth in the accompanying drawings and the description below. Other features and advantages of this specification will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
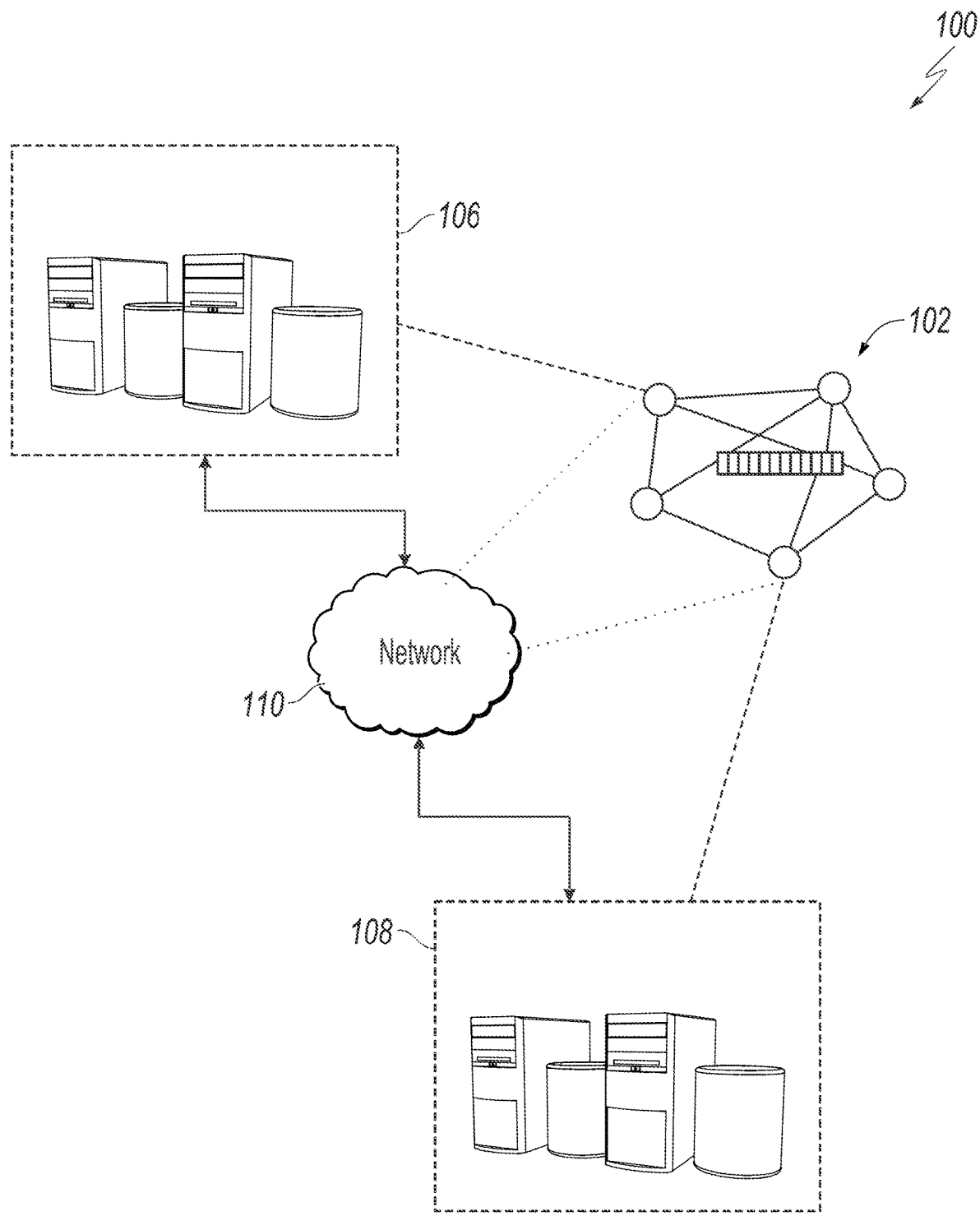
FIG. 1 is a diagram illustrating an example of an environment that can be used to execute embodiments of this specification.

This specification describes technologies for managing transactions in a blockchain network. These technologies generally involve managing transactions among users on a blockchain network by a scheduler node on the blockchain network. The scheduler node can perform a consolidation analysis on original pending transactions to generate a less number of modified pending transactions and submit modified pending transactions associated with particular users to a settlement account management (SAM) server for settlement (or execution). The technologies can help reducing the number of actual settlement transactions such that the blockchain network can process a large volume of transactions while using blockchain technology to achieve trust to every user and integrity to each transaction.

The techniques described in this specification produce several technical effects. In some embodiments, the technologies can be applied to blockchain payment networks or distributed payment networks, where the number of actual settlement transactions can be reduced and the credit-debit relationship can be preserved and endorsed by the blockchain technology. In some embodiments, the technologies can also be applied to cross-border remittance, inter-institution money transfer, personal digital wallet, and valued-added service related to digital asset management.

In some embodiments, the technologies can reduce or minimize total transaction traffic in the network, while achieving consensus from all users to maintain correct balance and doing each transaction in consolidated amount. In some embodiments, the technologies can reduce or minimize the number of actual settlement transactions, while keeping the number of the original pending transactions unchanged, which can provide better compatibility of other payment networks or digital asset management networks. In some embodiments, the scheduler node is a non-consensus node of the blockchain network. The scheduler node does not submit the modified pending transactions to the blockchain network, and can avoid performing a consensus process on the modified pending transactions in the blockchain network, thereby reducing operation costs and improving the efficiency of the blockchain network. Moreover, as the number of modified pending transactions is smaller than the original pending transactions, the number of actual settlement transactions is reduced and the number of settlement entries to be stored in the blockchain network is also reduced. This can also avoid increasing the storage space in the blockchain network.

In some embodiments, the techniques allow storing the original pending transactions and/or settlement entries of actual settlement transactions in a blockchain on the blockchain network. Thus the blockchain network can have a whole transaction graph for users (e.g., participants or accounts) in the blockchain network. In some embodiments, consensus nodes (e.g., customer bank nodes) associate with the users can store a complete copy of the blockchain. The blockchain network includes the scheduler node to perform the consolidation for the original pending transactions, while the blockchain network can achieve consensus from the users to maintain correct balance and perform each transaction in consolidated amount. The blockchain network can also provide verification services to the users by using the stored original pending transactions and settlement entries of the actual settlement transactions. Thus, the technologies can ensure correct balances in distributed ledgers and provide trustable and provable transactions.

In some embodiments, the scheduler node is synchronized with the blockchain network to receive transfer requests from client devices associated with the users. Thus, the scheduler node can perform real-time and dynamic consolidation on the original pending transactions. The scheduler node can be also synchronized with the blockchain network to receive a settlement query and/or settlement request from a particular user. The scheduler node can response to the settlement query by providing consolidated settlement information to the particular user or to response to the settlement request by transmitting an SAM settlement request to the SAM server for executing at least one modified transaction associated with the particular user. Thus, the blockchain network can process a large volume of transactions dynamically and in a decentralized way.

In some embodiments, a scheduling application programming interface (API) can be provided to client devices associated with users. The client devices can use the scheduling API to send transfer requests, transfer queries, settlement queries, and/or settlement requests to nodes of the blockchain network. In some embodiments, a blockchain API can be provided to the nodes for reading/writing transaction entries and/or reading blocks. In some embodiments, a settlement integration API can be provided to an SAM server for receiving settlement requests and providing responses. These APIs can help reduce total transaction costs.

To provide further context for embodiments of this specification, and as introduced above, distributed ledger systems (DLSs), which can also be referred to as consensus networks (e.g., made up of peer-to-peer nodes), and blockchain networks, enable participating entities to securely, and immutably conduct transactions, and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, transactions recorded on a blockchain are reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. The transactions, which have already been verified by the nodes of the blockchain network, are hashed and encoded into a Merkle tree. A Merkle tree is a data structure in which data at the leaf nodes of the tree is hashed, and all hashes in each branch of the tree are concatenated at the root of the branch. This process continues up the tree to the root of the entire tree, which stores a hash that is representative of all data in the tree. A hash purporting to be of a transaction stored in the tree can be quickly verified by determining whether it is consistent with the structure of the tree.

Whereas a blockchain is a decentralized or at least partially decentralized data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network. Embodiments of this specification are described in further detail herein with reference to a consortium blockchain network. It is contemplated, however, that embodiments of this specification can be realized in any appropriate type of blockchain network.

In general, a consortium blockchain network is private among the participating entities. In a consortium blockchain network, the consensus process is controlled by an authorized set of nodes, which can be referred to as consensus nodes, one or more consensus nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network.

In some examples, within a consortium blockchain network, a global blockchain is provided as a blockchain that is replicated across all nodes. That is, all consensus nodes are in perfect state consensus with respect to the global blockchain. To achieve consensus (e.g., agreement to the addition of a block to a blockchain), a consensus protocol is implemented within the consortium blockchain network. For example, the consortium blockchain network can implement a practical Byzantine fault tolerance (PBFT) consensus, described in further detail below.

FIG. 1 is a diagram illustrating an example of an environment 100 that can be used to execute embodiments of this specification. In some examples, the environment 100 enables entities to participate in a consortium blockchain network 102. The environment 100 includes computing devices 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link. In some examples, the network 110 enables communication with, and within the consortium blockchain network 102. In general the network 110 represents one or more communication networks. In some cases, the computing devices 106, 108 can be nodes of a cloud computing system (not shown), or each computing device 106, 108 can be a separate cloud computing system including a number of computers interconnected by a network and functioning as a distributed processing system.

In the depicted example, the computing devices 106, 108 can each include any appropriate computing system that enables participation as a node in the consortium blockchain network 102. Examples of computing devices include, without limitation, a server, a desktop computer, a laptop computer, a tablet computing device, and a smartphone. In some examples, the computing devices 106, 108 host one or more computer-implemented services for interacting with the consortium blockchain network 102. For example, the computing device 106 can host computer-implemented services of a first entity (e.g., user A), such as a transaction management system that the first entity uses to manage its transactions with one or more other entities (e.g., other users). The computing device 108 can host computer-implemented services of a second entity (e.g., user B), such as a transaction management system that the second entity uses to manage its transactions with one or more other entities (e.g., other users). In the example of FIG. 1, the consortium blockchain network 102 is represented as a peer-to-peer network of nodes, and the computing devices 106,108 provide nodes of the first entity, and second entity respectively, which participate in the consortium blockchain network 102.

Figure 2:
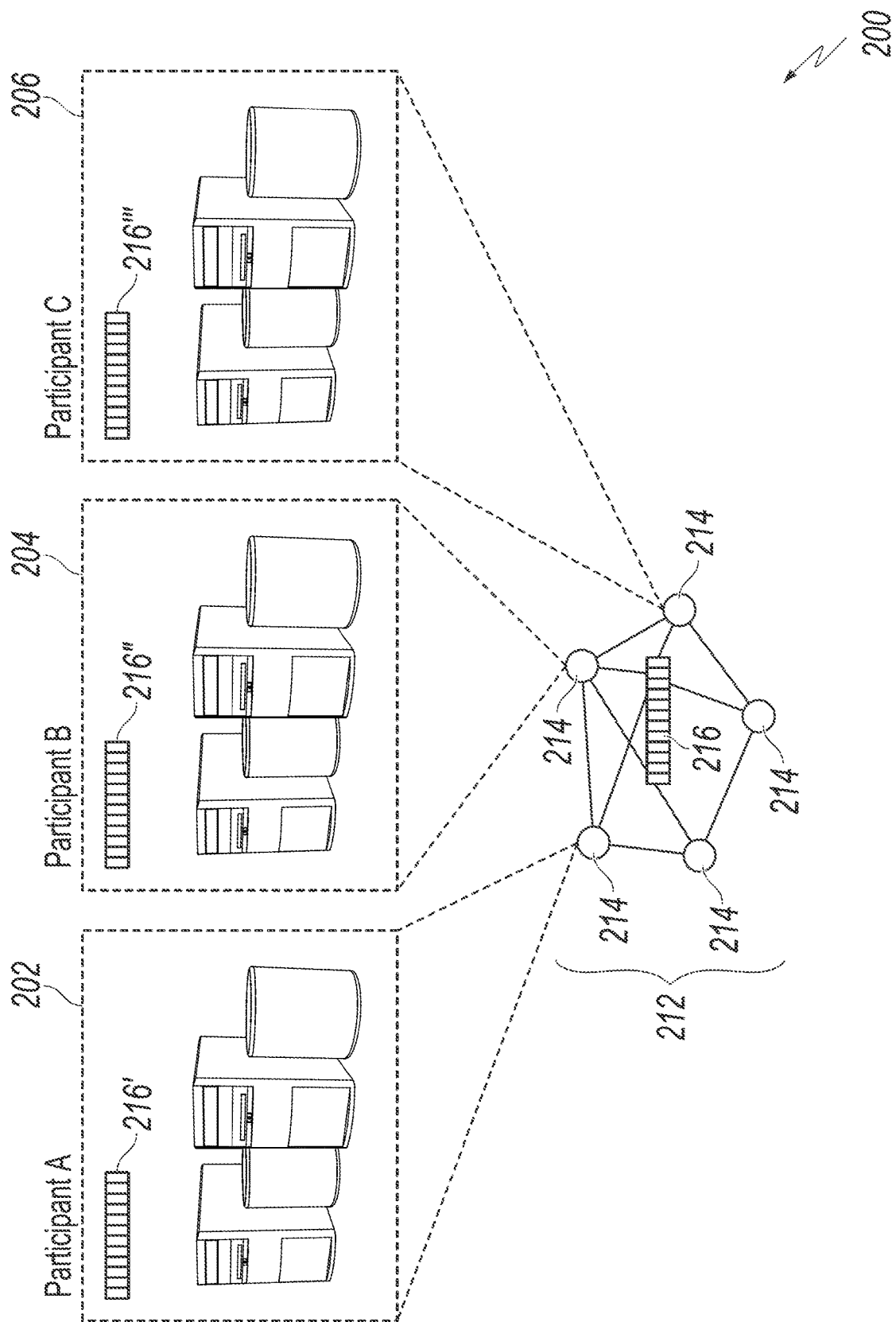
FIG. 2 is a diagram illustrating an example of an architecture in accordance with embodiments of this specification.

FIG. 2 is a diagram illustrating an example of an architecture 200 in accordance with embodiments of the specification. The example conceptual architecture 200 includes participant systems 202, 204, 206 that correspond to Participant A, Participant B, and Participant C, respectively. Each participant (e.g., user, enterprise) participates in a blockchain network 212 provided as a peer-to-peer network including a plurality of nodes 214, at least some of which immutably record information in a blockchain 216. Although a single blockchain 216 is schematically depicted within the blockchain network 212, multiple copies of the blockchain 216 are provided, and are maintained across the blockchain network 212, as described in further detail herein.

In the depicted example, each participant system 202, 204, 206 is provided by, or on behalf of Participant A, Participant B, and Participant C, respectively, and functions as a respective node 214 within the blockchain network. As used herein, a node generally refers to an individual system (e.g., computer, server) that is connected to the blockchain network 212, and enables a respective participant to participate in the blockchain network. In the example of FIG. 2, a participant corresponds to each node 214. It is contemplated, however, that a participant can operate multiple nodes 214 within the blockchain network 212, and/or multiple participants can share a node 214. In some examples, the participant systems 202, 204, 206 communicate with, or through the blockchain network 212 using a protocol (e.g., hypertext transfer protocol secure (HTTPS)), and/or using remote procedure calls (RPCs).

Nodes 214 can have varying degrees of participation within the blockchain network 212. For example, some nodes 214 can participate in the consensus process (e.g., as miner nodes that add blocks to the blockchain 216), while other nodes 214 do not participate in the consensus process. As another example, some nodes 214 store a complete copy of the blockchain 216, while other nodes 214 only store copies of portions of the blockchain 216. For example, data access privileges can limit the blockchain data that a respective participant stores within its respective system. In the example of FIG. 2, the participant systems 202, 204, and 206 store respective, complete copies 216', 216", and 216'" of the blockchain 216.

A blockchain (e.g., the blockchain 216 of FIG. 2) is made up of a chain of blocks, each block storing data. Examples of data include transaction data representative of a transaction between two or more participants. While transactions are used herein by way of non-limiting example, it is contemplated that any appropriate data can be stored in a blockchain (e.g., documents, images, videos, audio). Examples of a transaction can include, without limitation, exchanges of something of value (e.g., assets, products, services, currency). The transaction data is immutably stored within the blockchain. That is, the transaction data cannot be changed.

Before storing in a block, the transaction data is hashed. Hashing is a process of transforming the transaction data (provided as string data) into a fixed-length hash value (also provided as string data). It is not possible to un-hash the hash value to obtain the transaction data. Hashing ensures that even a slight change in the transaction data results in a completely different hash value. Further, and as noted above, the hash value is of fixed length. That is, no matter the size of the transaction data the length of the hash value is fixed. Hashing includes processing the transaction data through a hash function to generate the hash value. An example of a hash function includes, without limitation, the secure bash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, the consensus node generates a block header, hashes all of the transactions in the block, and combines the hash value in pairs to generate further hash values until a single hash value is provided for all transactions in the block (the Merkle root hash). This hash is added to the block header. The consensus node also determines the hash value of the most recent block in the blockchain (i.e., the last block added to the blockchain). The consensus node also adds a nonce value, and a timestamp to the block header.

In general, PBFT provides a practical Byzantine state machine replication that tolerates Byzantine faults (e.g., malfunctioning nodes, malicious nodes). This is achieved in PBFT by assuming that faults will occur (e.g., assuming the existence of independent node failures, and/or manipulated messages sent by consensus nodes). In PBFT, the consensus nodes are provided in a sequence that includes a primary consensus node, and backup consensus nodes. The primary consensus node is periodically changed, Transactions are added to the blockchain by all consensus nodes within the blockchain network reaching an agreement as to the world state of the blockchain network. In this process, messages are transmitted between consensus nodes, and each consensus nodes proves that a message is received from a specified peer node, and verifies that the message was not modified during transmission.

In PBFT, the consensus protocol is provided in multiple phases with all consensus nodes beginning in the same state. To begin, a client sends a request to the primary consensus node to invoke a service operation (e.g., execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

In some blockchain networks, cryptography is implemented to maintain privacy of transactions. For example, if two nodes want to keep a transaction private, such that other nodes in the blockchain network cannot discern details of the transaction, the nodes can encrypt the transaction data. An example of cryptography includes, without limitation, symmetric encryption, and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can en-/de-crypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 2, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 2, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

In some examples, a transaction include a transfer, payment, management, or another type operation on a digital asset. A transaction can involve one or more participants (also referred to as entities or users). The blockchain can store transaction data including a plurality of transactions among a plurality of participants. In some embodiments, a status (pending, authorized, or committed/executed) of a transaction can also be recorded in a blockchain of a blockchain network. As the number of transactions may be accumulated to a large volume, the performance of the blockchain network can be impacted, together with increasingly required storage space. However, from a participant's perspective, he/she may only concern totally how much money in debit or how much money credited, not necessarily concerning about where the money comes from or where the money goes, for example, in a period of time. In some cases, consolidating transactions related to particular participants can address the participants' concerns.

Figure 3:
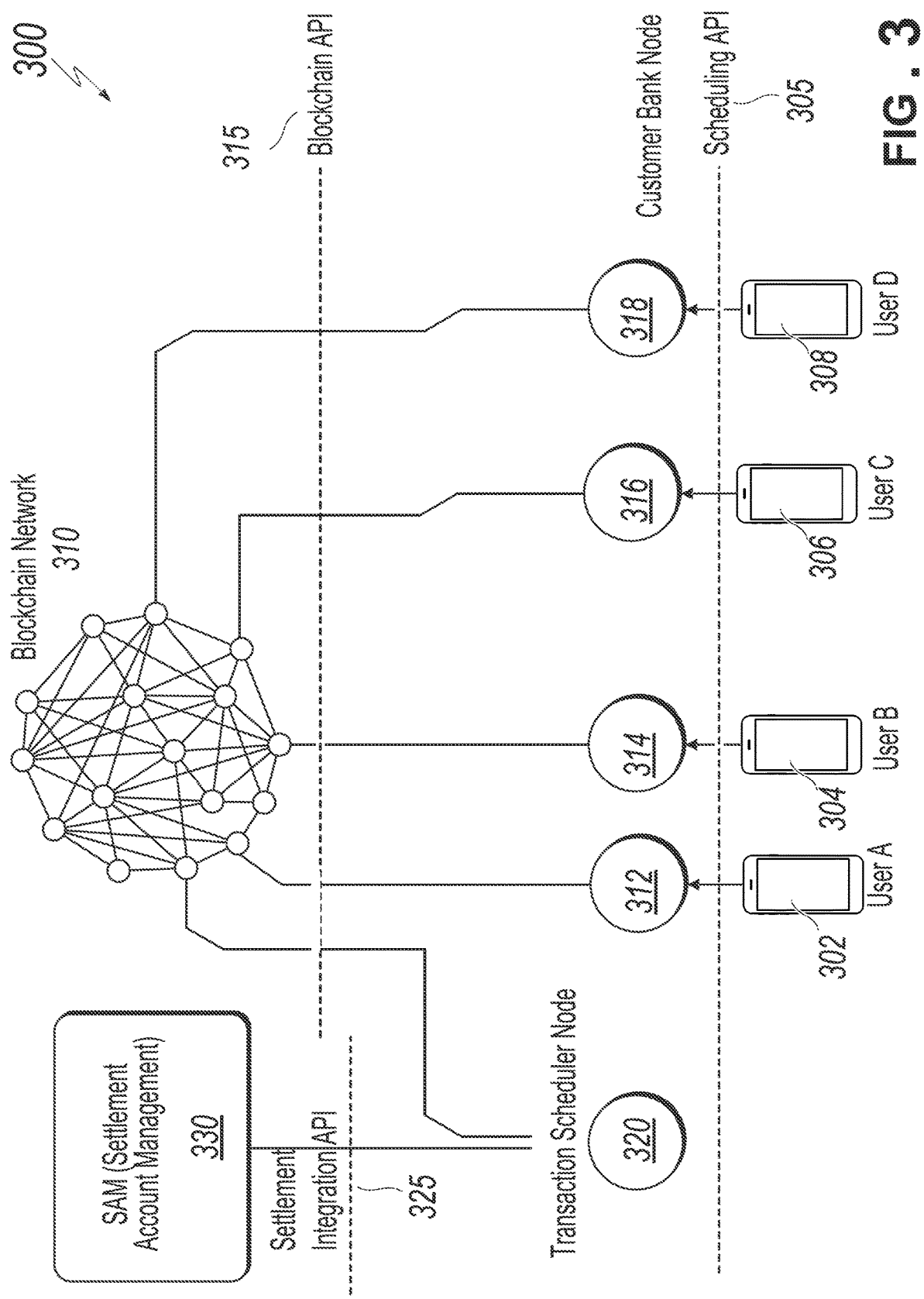
FIG. 3 is a diagram illustrating an example of a transaction system in accordance with embodiments of this specification.

FIG. 3 is a diagram illustrating an example of a system 300 in accordance with embodiments of this specification. The example system 300 implements managing transactions in a blockchain network by dynamic transaction consolidation, which can minimize or otherwise reduce total transaction traffic in the blockchain network while achieving consensus from participants to maintain correct balance and executing each transaction with consolidated settlement.

In some embodiments, a transaction can be a joint or multi-party transaction among multiple users (or participants) and each user can be associated with a client device and/or network node of a blockchain network (e.g., client devices executing the client service logic and blockchain network nodes executing smart contracts). As an example, the system 300 includes a blockchain network 310 having one or more blockchain network nodes (e.g., customer bank nodes 312, 314, 316, 318 and a transaction scheduler node 320), one or more client devices (e.g., a client device 302 associated with user A, a client device 304 associated with user B, a client device 306 associated with user C, and a client device 308 associated with user D), and a settlement account management (SAM) server 330. The scheduling node 320 can be configured to manage transactions among the users in the blockchain network 310 and communicate with the SAM server 330 for transaction settlement.

In some embodiments, the blockchain network 310 is a consortium blockchain network and stores transaction data associated with the users in a blockchain. The customer bank nodes 312, 314, 316, 318 can be consensus nodes that can store a complete copy of the blockchain. The client device 302, 304, 306, or 308 can include, for example, any suitable computer, module, server, or computing element programmed to perform methods described herein. In some embodiments, the client device can include a user device, such as, a personal computer, a smartphone, a tablet, or other handheld device.

In some embodiments, each user is associated with a respective client device and a respective customer bank node and performs transactions with one or more other users through the respective client device and the respective customer bank node in the blockchain network. For examples, user A, B, C, or D can use the client device 302, 304, 306, or 308 to communicate with the respective customer bank node 312, 314, 316, or 318 via a scheduling application programming interface (API) 305, while the node 312, 314, 316, or 318 can communicate with the blockchain network 310 or other network nodes through a blockchain API 315.

In some embodiments, an API includes a set of subroutine definitions, communication protocols, and tools for building software, and defines functionality provided by a program (module, library) and allows abstraction from exactly how this functionality is implemented. Software components interact with each other through APIs. As discussed with further details below, the scheduling API 305 can implement functionalities of transferring transaction data including transfer requests, transfer queries, settlement requests, or settlement queries. User A, B, C, or D can use the client device 302, 304, 306, or 308 to send the transaction data to the respective customer bank node 312, 314, 316, or 318 through the scheduling API 305. Similarly, the blockchain API 315 can implement functionalities of reading transaction data or writing transaction data. The customer bank node 312, 314, 316, or 318 can write the transaction data in a blockchain through a consensus process or read the transaction data or other transaction data from the blockchain through the blockchain API 315.

For example, user A may have an original pending transaction to transfer an amount of units, e.g., 5 units, to user C. The units may be any transferable item including currency, stocks, bonds, derivatives, treasuries, collateral, or any other item that is transferrable by a transaction. For illustration purpose only, dollar ($) is used as an example of unit herein. User A can use the client device 302 to send a transfer request, e.g., A→C: $5, to the customer bank node 312. The transfer request corresponds to the original pending transaction and includes the amount or value associated with the original pending transaction, e.g., $5, and an identification of a party, e.g., user A, and a counterpart for the original pending transaction, e.g., user C. In some embodiments, after performing a consensus process among all consensus nodes of the blockchain network 310, customer bank node 312 can write the original pending transaction corresponding to the transfer request into a blockchain, e.g., through the blockchain API 315. Similarly, user A can use the client device 302 to send a second transfer request, e.g., A→D: $15, to the customer bank node 312 that can further write the second original pending transaction corresponding to the second transfer request into the blockchain. User B can use the client device 304 to send third and fourth transfer requests associated with user B, e.g., B→C: $20 and B→D: $5, to the customer bank node 314 that can write the third and fourth original pending transactions corresponding to the third and fourth transfer requests into the same blockchain. The original pending transactions can be represented or illustrated in a transaction graph, e.g., as illustrated in graph (i) in FIG. 4.

In some embodiments, the blockchain network 310 sends settlement requests to the SAM server 330 to execute the original pending transactions. The SAM server 330 can be a computing system including a number of computers interconnected, e.g., by a network or locally, and functioning as a processing system. The SAM server 330 is a centralized system that can be configured to execute a number of transactions from a number of entities, e.g., blockchain networks including the blockchain network 310 or individual banks. After executing the transactions, the SAM server 330 can send acknowledgement messages to corresponding entities. The SAM server 330 can be external to the blockchain network 310 and securely communicate with the blockchain network 310 via a network, e.g., the network 110 of FIG. 1.

In one example, after receiving a client request from user A that authorizes to settle an original pending transaction, e.g., A→C: $5, the customer bank node 312 can send a settlement request to the SAM server 330 to execute the original pending transaction. The SAM server 330 can then execute the original pending transaction by transferring $5 from user A's bank account to C's bank account. After the SAM server 330 sends back an acknowledgement confirming that the original pending transaction has been executed, the customer bank node 302 can store a settlement entry into the blockchain, together with the original pending transaction. The settlement entry indicates that the original pending transaction has been executed. If all of the four original pending transactions shown in graph (i) in FIG. 4 have been executed by the SAM server 330, four settlement entries can be generated and stored in the blockchain. That is, the number of settlement entries is identical to the number of original pending transactions.

In some embodiments, the blockchain network 310 includes a transaction scheduler node 320. The scheduler node 320 is configured to manage transactions in the blockchain network 310 and communicate with the SAM server 330, e.g., through settlement integration API 325. The settlement integration API 325 allows the SAM server 330 to implement functionalities of receiving settlement requests transmitted from the scheduler node 320 and transmitting settlement responses, e.g., acknowledgements, to the scheduler node 320. The scheduler node 320 can be a computing system including one or more computers, e.g., the computing device 106 or 108 of FIG. 1. The scheduler node 320 can be different from the other customer bank nodes 312, 314, 316, 318. For example, the scheduler node 320 can be a non-consensus node and does not automatically store a complete copy of the blockchain storing transaction data. In some embodiments, unlike a consensus node, a non-consensus node of a blockchain network is a network node that does not participate in a consensus protocol to perform a consensus process with other network nodes of the blockchain network. In some embodiments, a non-consensus node does not need to store a complete copy of the blockchain of the blockchain network.

In some embodiments, the scheduler node 320 is configured to synchronize with the blockchain network 310, e.g., with the blockchain API 315, to obtain each of a plurality of transfer requests from a respective client device associated with a respective user. For example, after the customer bank node 312 submits a transfer request from the client device 302 associated with user A, e.g., A→C: $5, to the blockchain network 310 through the blockchain API 315, the scheduler node 320 can obtain the transfer request from the blockchain network 310 or the blockchain API 315. In some embodiments, the scheduler node 320 can accumulate the transfer requests from different users and store them as original pending transactions associated with the different users. Thus, the original pending transactions stored in the scheduler node 320 can be the same as the original pending transactions stored in the blockchain on the blockchain network 310.

The scheduler node 320 is configured to perform a consolidation analysis on a plurality of original pending transactions to generate a plurality of modified pending transactions, and the number of modified pending transactions is smaller than the number of original pending transactions. Thus, the scheduler node 320 can perform the consolidation analysis to reduce the number of pending transactions while maintaining equivalence between the plurality of original pending transactions and the plurality of modified pending transactions. Since the scheduler node 320 can transmit the modified pending transactions to the SAM server 330 for execution, the number of transactions to be executed by the SAM server 330 can be reduced. The scheduler node 320 sends settlement entries indicating the execution of the transactions to the blockchain network 310 for storing together with the original pending transactions in a blockchain. Thus, with the reduced number of executed transactions, the blockchain network 310 can store less number of settlement entries in the blockchain.

In some cases, the scheduler node 320 can perform a consolidation analysis on original pending transactions associated with a sub-group of the users who make transactions in the blockchain network 310. For example, the sub-group of users can be associated with one or more particular customer bank nodes. In some cases, the scheduler node 320 can perform a consolidation analysis on original pending transactions occurred within a period of time, e.g., a day, a week, or a month. In some cases, the scheduler node 320 can dynamically perform a consolidation analysis on original pending transactions when one or more new transfer requests are received. In some cases, the scheduler node 320 can perform a consolidation analysis on original pending transactions in response to receiving a query from a user, the query requesting information of consolidated debts (or credits) the user owns (or has).

In some embodiments, the scheduler node 320 performs the consolidation analysis by using a debit-credit graph with an optimization algorithm or any other algorithms for reducing a total number of edges in the debit-credit graph while maintaining equivalence between the original graph and the modified graph. The optimization algorithm can be an algorithm for solving a minimum-cost flow problem (MCFP) or a variant thereof. In some embodiments, such algorithms can be referred to as minimum-cost flow algorithms. In an example process of the optimization algorithm, first, the plurality of original pending transactions are represented on a directed transaction graph. As illustrated in graph (i) of FIG. 4, transactions among users A, B, C, D are shown on the directed transaction graph, including four transfers: A→C: $5, A→D: $10, B→C: $20, and B→D: $5. Second, a plurality of modified pending transactions are determined by modifying the directed transaction graph with the optimization algorithm and then represented on a modified transaction graph. As illustrated in graph (ii) of FIG. 4, the modified pending transactions include only two transfers: A→D: $15 and B→C: $25, which are equivalent to the four transfers shown in graph (i) of FIG. 4, because the consolidated debt A owns is identical to the consolidated credit D, i.e., $15, and the consolidated debt B is identical to the consolidated credit C, i.e., $25.

The process of the optimization algorithm can be described with details herein. First, transfers on the directed transaction graph can be weighed using debts of transactions. For example, an optimization function can be expressed as follows:

$V=\{v_1, v_2, \ldots, v_n\}$, where $v_i$ represents user $i$ (a participant or an account);

$E=\{<v_i,v_j>|v_i,v_j \text{ in } V\}$, where $E$ represents transfers or transactions among $V$;

$W=\{w_{ij}>0|<v_i,v_j> \text{ in } E\}$, where $w_{ij}$ represents the weight (or the debt amount) of transaction $<v_i, v_j>$;

$G=<V,E,W>$, where $G$ is a function of $V,E,W$, and

Figure 4:
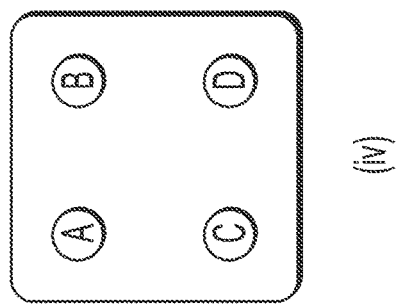
FIG. 4 shows graphs illustrating a consolidation transaction formulation in accordance with embodiments of this specification.
Figure 4:
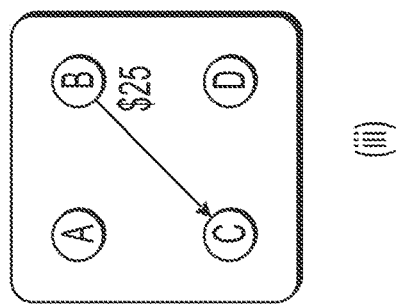
Figure 4:
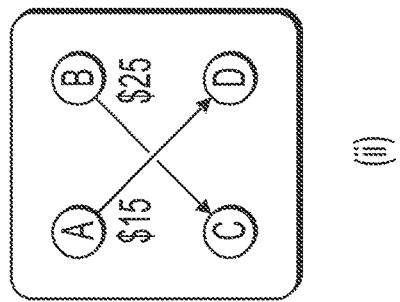
Figure 4:
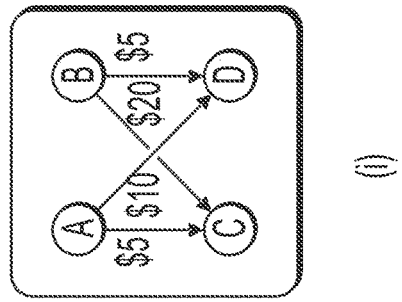

Metrics $(G)=|E|=$number of graph edges, which measures the number of transfers. The scheduler node 320 can perform the consolidation analysis by minimizing metrics (G). For example, metrics (G) for graph (i) of FIG. 4 is 4. After consolidation, metrics (G) for graph (ii) of FIG. 4 becomes 2.

Second, a respective consolidated debt for each of the plurality of users is calculated according to the following expression:

$$\text{Debt}(v_i)=\Sigma_x w_{ix}-\Sigma_y w_{yi}.$$

Accordingly, the consolidated debts for users A, B, C, D for the four transactions presented on graph (i) of FIG. 4 can be calculated, respectively:

$$\text{Debt}(A)=5+10=15$$

$$\text{Debt}(B)=20+5=25$$

$$\text{Debt}(C)=-5-20=25$$

$$\text{Debt}(A)=-10-5=-15$$

Third, the plurality of users can be split into two groups: debtors and creditors:

$$\text{Debtors}=\{A:15, B:25\},$$

$$\text{Creditors}=\{C:-25, D:-15\}$$

Then each of the two groups can be sorted by the debt amounts:

$$\text{Debtors}=\{B:25, A:15\},$$

$$\text{Creditors}=\{C:-25, D:-15\}.$$

Fourth, users in these two groups can be matched based on the respective consolidated debts. For example, a debtor and a creditor having the same amount of debt and credit can be matched together as a modified pending transaction, e.g., B→C: $25. The optimization algorithm can continue matching until no more match can be found among the two groups. The matched results can be collected to become the modified pending transactions, e.g., B→C: $25 and A→D: $15. As noted above, the modified pending transactions can be presented in a modified transaction graph, e.g., as illustrated in graph (ii) of FIG. 4.

The scheduler node 320 is configured to store and maintain the original pending transactions with (or using) the modified pending transactions. In some cases, the scheduler node 320 is a non-consensus node and is configured not to provide the modified pending transactions through the blockchain API 315 to the blockchain network 310 to update the blockchain that stores transaction data including the original pending transactions. That is, the transaction data in the blockchain is not updated with the modified pending transactions, and there is no consensus process among individual consensus nodes, e.g., customer bank nodes 312, 314, 316, 318.

The scheduler node 320 can dynamically update the modified pending transactions. The scheduler node 320 can receive a new transfer request corresponding to a new original pending transaction. In some cases, the scheduler node 320 does not store generated modified pending transactions but store the original pending transactions and settlement entries for executed transactions. The scheduler node 320 can perform a new consolidation analysis on the stored original pending transactions and settlement entries and the new original pending transaction to generate new modified pending transactions. In some cases, the scheduler node 320 can change one or more modified pending transactions with the new original pending transaction to update the modified pending transactions. In some cases, the scheduler node 320 can perform a new consolidation analysis on the stored modified pending transactions and the new original pending transaction to generate new modified pending transactions.

As noted above, the scheduler node 320 can send modified pending transactions to the SAM servers for execution. When one of the modified pending transactions has been executed. e.g., A→D: $15 is executed, the scheduler node 320 can update the modified pending transactions by removing the executed modified pending transaction. As illustrated in graph (iii) of FIG. 4, the transfer A→D: $15 is removed from the transaction graph that only presents the remaining modified pending transactions, e.g., B→C: $25. Accordingly, the scheduler node 320 can store a settlement entry indicating the executed modified pending transaction, together with the original pending transactions and the other unexecuted modified pending transaction. The scheduler node 320 can also send the settlement entry to the blockchain network 310 that can store the settlement entry in the blockchain, together with the original pending transactions.

When all of the modified pending transactions have been executed, all the transfers are removed from the transaction graph, as illustrated in graph (iv) of FIG. 4. Accordingly, the scheduler node 320 can store respective settlement entries indicating the executed transactions, together with the original pending transactions. The scheduler node 320 can send the respective settlement entries to the blockchain network 310 for storing together with the original pending transactions. As the number of modified pending transactions is smaller than the number of original pending transactions, the transactions executed by the SAM server 330 is reduced, and accordingly the blockchain network 310 can store less number of settlement entries in the blockchain than storing settlement entries for executing the original pending transactions.

In an example, as noted above, for the 4 original pending transactions presented in graph (i) of FIG. 4, 4 settlement entries will be stored in the blockchain when the 4 original pending transactions are executed, and there will be total 8 entries in the blockchain. In contrast, if the 4 original pending transactions are consolidated to generate 2 modified pending transactions, only 2 settlement entries will be stored in the blockchain when the 2 modified pending transactions are executed, and there will be total 6 entries in the blockchain, which is smaller than the 8 entries in the blockchain for executing the original pending transactions.

The blockchain network 310 can provide a verification service to users. For example, user A may send a query to the customer bank node 312 to check settlement information for user A, e.g., whether all debts associated with user A have been paid. The blockchain network 310, e.g., the customer bank node 312, can verify the settlement information by analyzing the original pending transactions and the settlement entries of the executed transactions stored in the blockchain. In some cases, the blockchain network 310 can generate a debit-credit transaction graph by analyzing the original pending transactions and the settlement entries. The blockchain network 310 can determine the settlement information associated with user A by determining whether there is any remaining transfer associated with user A and presented in the transaction graph. For example, graph (ii) shows that user A has a consolidated debt of $15, while graph (iii) or graph (iv) shows that user A has no debt after the modified pending transaction associated with user A has been executed.

Figure 5:
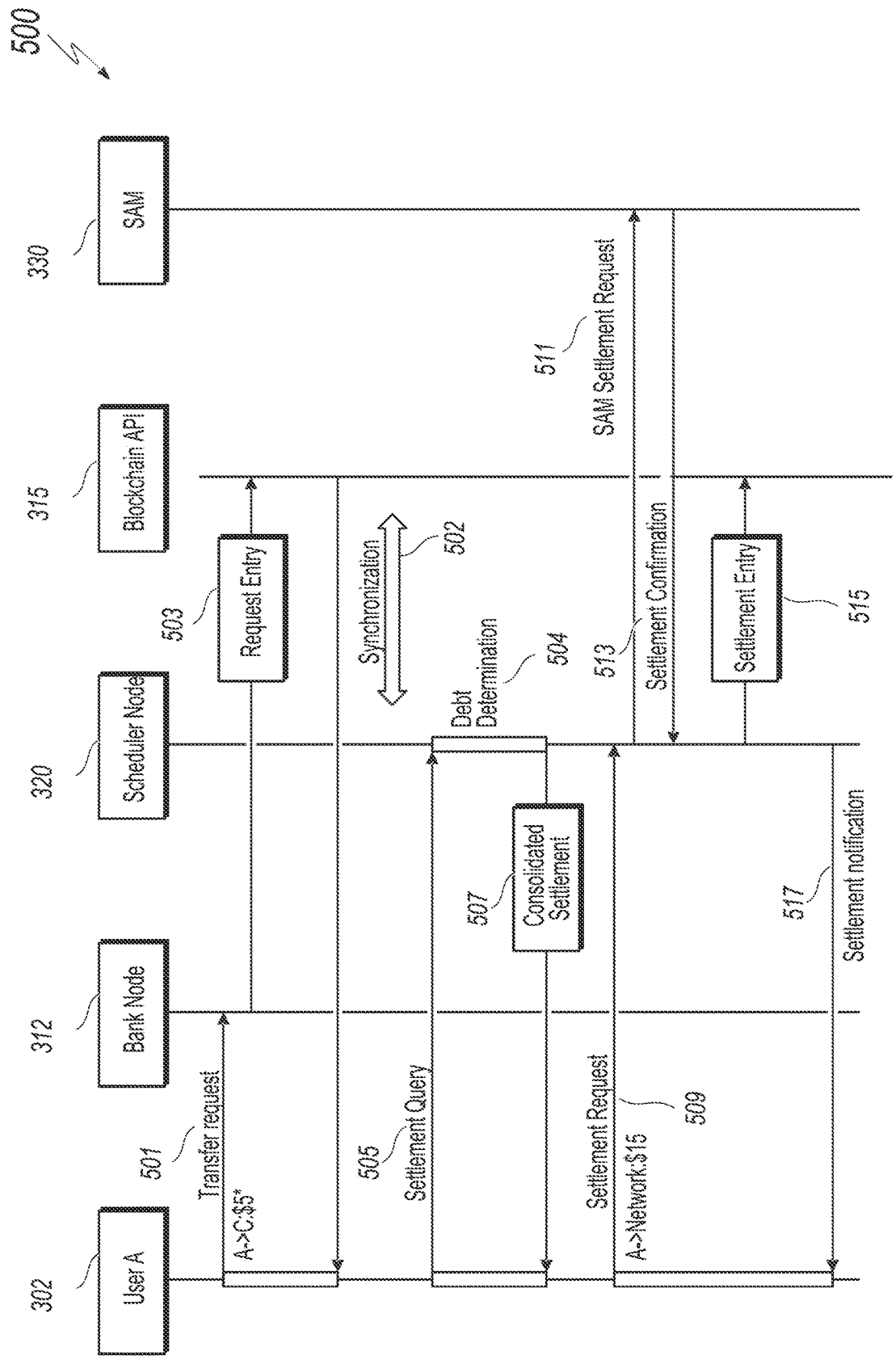
FIG. 5 is a transaction flow illustrating an example of a process that can be executed in accordance with embodiments of this specification.

FIG. 5 is a transaction flow illustrating an example of a process 500 that can be executed in accordance with embodiments of this specification. The process 500 can be performed by the system 300 of FIG. 3. It is assumed that there are four original pending transactions as shown in graph (i) of FIG. 4, that is, A→C: $5, A→D: $10, B→C: $20, and B→D: $5. For illustration purposes only, the process 500 is performed from user A's perspective.

First, user A uses the associated client device 302 to send a transfer request 501, A→C: $5, to the associated customer bank node 312. The customer bank node 312 writes a request entry 503 corresponding to the transfer request 501 in a blockchain on the blockchain network 310 through the blockchain API 315. The scheduler node 320 is synchronized with the blockchain network 310 and obtains the request entry 503 from the blockchain API 315. Both the transfer request 501 and the request entry 503 correspond to an original pending transaction, i.e., A→C: $5. Similarly, other transfer requests, A→D: $10, B→C: $20, and B→D: $5, can be received and written into the blockchain, and the scheduler node 320 can be synchronized to obtain the other transfer requests.

Second, user A uses the client device 302 to send a settlement query 505 to the customer bank node 312. User A is associated with one or more original pending transactions, e.g., A→C: $5 and A→D: $10. The settlement query can request settlement information associated with user A, e.g., how much total debt user A owns to the blockchain network. One example of the settlement query can be expressed as {A→Network: $?}. The scheduler node 320 can obtain the settlement query 505 from the blockchain network 310. For example, the customer bank node 312 can send the settlement query 505 to the blockchain API 315 that forwards the settlement query 505 to the scheduler node 320, or the scheduler node 320 is synchronized to receive the settlement query 505 and response to the settlement query 505. In some cases, the client device 302 directly sends the settlement query 505 to the scheduler node 320 through the scheduling API 305.

Third, the scheduler node 320 determines a consolidate settlement associated with user A by debt determination processing 504. The scheduler node 320 maintains real-time transaction data including all original pending transactions associated with users including user A and settlement entries for executed transactions. In some cases, in response to receiving the settlement query 505, the scheduler node 320 can perform a consolidation analysis on the original pending transactions and settlement entries to generate modified pending transactions, e.g., B→C: $25 and A→D: $15. The scheduler node 320 can then obtain a consolidated settlement associated with user A from at least one modified pending transaction associated with user A, e.g., A→D: $15. In some cases, the real-time transaction data includes real-time updated modified pending transactions. The scheduler node 320 can identify at least one modified pending transaction associated with user A from the real-time updated modified pending transactions and determine a consolidated settlement for user A. In some cases, the scheduler node 320 can identify at least one original pending transaction and/or at least one settlement entry associated with user A from the stored original pending transactions and calculate a consolidated settlement based on the original pending transaction and the settlement entry associated with user A.

Fourth, the scheduler node 320 sends a query response 507 to the client device 302 associated with user A. The query response 507 can include the consolidated settlement associated with user A, e.g., $15. The query response 507 can include an optimized transfer that can be expressed as: {A→Network: $15}. That is, the optimized transfer can just show that A owns the blockchain network $15, without disclosing the modified pending transaction associated with user A, e.g., A→D: $15. In some cases, the scheduler node 320 directly sends the query response 507 to the client device 302. In some cases, the scheduler node 320 sends the query response 507 to the customer bank node 312 or the blockchain network 310 that provides the query response 507 to the client device 302.

Fifth, the client device 302 associated with user A sends a settlement request 509 to the scheduler node 320, e.g., through the customer bank node 312 or the blockchain network 310. The settlement request 509 indicates that user A authorizes to execute settlement for user A. The settlement request 509 can be expressed as the optimized transfer {A→Network: $15}. That is, user A authorizes to pay the consolidated settlement $15 to the blockchain network 310.

Sixth, in response to receiving the settlement request 509, the scheduler node 520 sends an SAM settlement request 511 to the SAM server 330. The SAM settlement request 511 includes the modified pending transaction associated with user A to the SAM server 330, e.g., A→D: $15, without the original pending transaction associated with user A, e.g., A→C: $5 and A→D: $10. The SAM settlement request 511 requests the SAM server 330 to execute the modified pending transaction associated with user A, such that the consolidated settlement associated with user A can be processed.

Seventh, the SAM server 330 executes the modified pending transaction associated with user A by transferring the consolidated settlement, e.g., $15, from an account associated with user A to an account associated with user D.

Eighth, after the execution, the SAM server 330 sends a settlement confirmation 513 to the scheduler node 320. The settlement confirmation 513 can indicate that the modified pending transaction associated with user A has been executed.

Ninth, in response to receiving the settlement confirmation 513, the scheduler node 520 can send a settlement entry 515, e.g., A→D settlement for $15, to the blockchain network 310 through the blockchain API 315. As noted above, the blockchain network 310 can store the settlement entry 515 in a blockchain that stores transaction data including the original pending transactions. The consensus nodes, e.g., the customer bank nodes 312, 314, 316, 318, can update the blockchain with the settlement entry 515 through a consensus process.

In some cases, in response to receiving the settlement confirmation 513, the scheduler node 520 can send a settlement notification 517 to the client device 302 associated with user A, e.g., directly or through the customer bank node 312. The settlement notification 517 can indicate that the consolidated settlement associated with user A has been performed or the total debt user A owns to other users in the blockchain network 310 has been paid.

In some cases, in response to receiving the settlement confirmation 513, the scheduler node 520 can store the settlement entry together with the original pending transactions, update the stored modified pending transaction by removing the executed modified pending transaction, or update the transaction graph by removing the transfer corresponding to the executed modified pending transaction, as illustrated in graphs (ii) and (iii) of FIG. 4.

Figure 6:
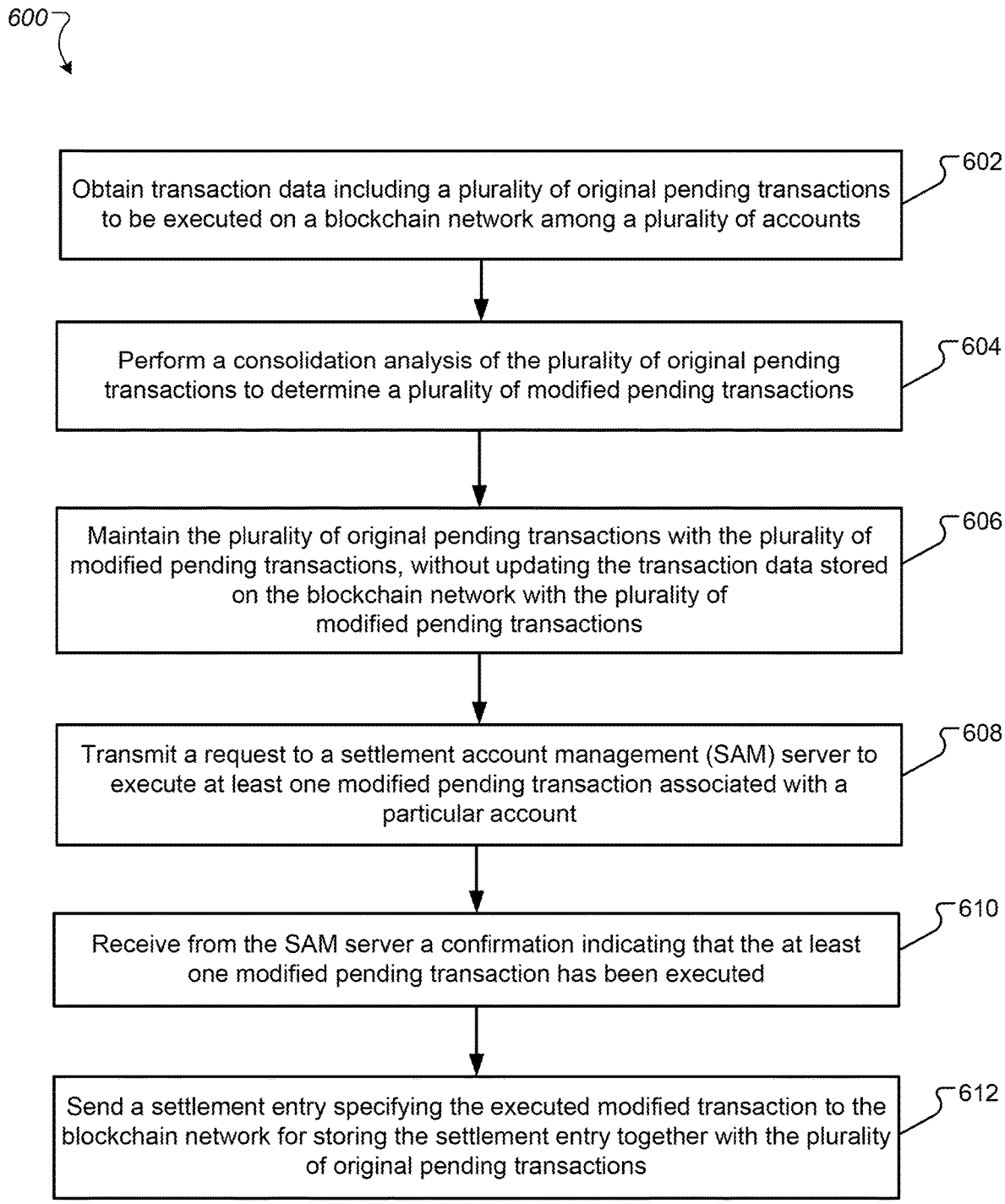
FIG. 6 is a flowchart illustrating a process that can be executed in accordance with embodiments of this specification.

FIG. 6 is a flowchart illustrating an example of a process 600 for implementation of transaction management that can be executed in accordance with embodiments of this specification. For convenience, the process 500 will be described as being performed by a system of one or more computers, located in one or more locations, and programmed appropriately in accordance with this specification. For example, a distributed system, e.g., the system 300 of FIG. 3, appropriately programmed, can perform the process 500. The system can include a blockchain network, e.g., the blockchain network 310 of FIG. 3, and a settlement server, e.g., the SAM server 330 of FIG. 3. The blockchain network can include a transaction scheduler node, e.g., the scheduler node 320 of FIG. 3, and one or more consensus nodes, e.g., customer bank nodes 312, 314, 316, 318 of FIG. 3.

At 602, transaction data is obtained at the scheduler node. The transaction data includes a plurality of original pending transactions to be executed on the blockchain network. The plurality of original pending transactions can be among a plurality of accounts associated with users. The users can use respective client devices to send transfer requests corresponding to the plurality of original pending transactions to the blockchain network (e.g., to a consensus node or a non-consensus node of the blockchain network). For example, a user can send a transfer request to a consensus node associated with the user. The consensus node can then write the transfer request to a blockchain through a blockchain API.

In some embodiments, the scheduler node can be a non-consensus node of the blockchain network. The scheduler node can synchronize with the blockchain network, for example, by a subscription to receive the transfer request from the blockchain network when the blockchain network receives the transfer request. The scheduler node can accumulate the received transfer request to obtain the transaction data. The blockchain network can store corresponding transaction data including the original pending transactions associated with the users.

At 604, a consolidation analysis is performed at the scheduler node to determine a plurality of modified pending transactions. The scheduler node can perform the consolidation analysis in response to receiving one or more transfer requests, e.g., transfer request 501 of FIG. 5, or a settlement query from a user, e.g., the settlement query 505 of FIG. 5. The scheduler node can also perform the consolidation analysis periodically, e.g., per day, per week, or per month. The scheduler node can perform the consolidation analysis based on the original pending transactions associated with all the users or the original pending transactions associated with a sub-group of the users.

The scheduler node can perform the consolidation analysis using an optimization algorithm, such as, a minimum-cost flow algorithm. The optimization algorithm is configured to reduce or minimize the number of transactions such that the number of the modified pending transactions is smaller than the number of original pending transactions while maintaining equivalence between the number of the modified pending transactions and the number of the original pending transactions.

In some cases, the scheduler node performs the consolidation analysis by calculating a respective consolidated settlement for each of the plurality of accounts based on the plurality of original pending transactions. Then the plurality of accounts is grouped into a first group, e.g., a debtor group, and a second group, e.g., a creditor group, based on the respective consolidated settlements for the plurality of accounts. The first group and the second group can be sorted based on the respective consolidated settlements. The scheduler node can match accounts in the first group with accounts in the second group, where the matched accounts have the same amount of consolidated settlements in debt and in credit. Then the scheduler node can generate the plurality of modified pending transactions based on a result of the matching.

The scheduler node can present the original pending transactions on a directed transaction graph, e.g., graph (i) of FIG. 4, and determine the plurality of modified pending transactions by modifying the transaction graph. The plurality of modified pending transactions can be presented in a modified transaction graph, e.g., graph (ii) of FIG. 4.

At 606, the scheduler node maintains the plurality of original pending transactions with the plurality of modified pending transactions, without updating the transaction data stored in the blockchain on the blockchain network. In some embodiments, in response to that the scheduler node receives a new transfer request, the scheduler node can update the stored original pending transactions with a new original pending transaction corresponding to the new transfer request. The scheduler node can also update the stored modified pending transactions by performing a new consolidation analysis based on the new original pending transaction. When the scheduler node receives a settlement entry indicating that a particular modified pending transaction has been executed, the scheduler node can remove the particular modified pending transaction from the stored modified pending transaction and/or store the settlement entry with the original pending transactions and/or the other modified pending transactions.

At 608, the scheduler node transmits a request to an SAM server to execute at least one modified pending transaction associated with a particular account. In some cases, the scheduler node obtains a settlement query from a client device associated with the particular account. The settlement query requests settlement information for the particular account associated with one or more original pending transactions. In response to obtaining the settlement query from the client device, the scheduler node can identify the at least one modified pending transaction associated with the particular account and transmit the settlement request to the SAM server. The scheduler node can also transmit the request periodically for the particular account.

At 610, the scheduler node receives from the SAM server a confirmation indicating that the at least one modified pending transaction associated with the particular account has been executed. The SAM server can execute the modified pending transaction, e.g., by transferring the consolidated settlement indicated in the modified pending transaction from the particular account to a counterpart indicated in the modified pending transaction. After the execution, the SAM server can transmit the confirmation to the scheduler node.

At 612, the scheduler node sends to the blockchain network a settlement entry specifying that the modified pending transaction associated with the particular account has been executed. The blockchain network can store the settlement entry in a blockchain, together with the plurality of original pending transactions. The consensus nodes can update the blockchain with the settlement entry through a consensus process.

In some cases, in response to receiving the settlement confirmation from the SAM server, the scheduler node can send a settlement notification to the client device associated with the particular account. The settlement notification can indicate that the consolidated settlement associated with the particular account has been performed or the total debt the particular account owns to other users in the blockchain network has been paid.

In some cases, in response to receiving the settlement confirmation from the SAM server, the scheduler node can store the settlement entry together with the original pending transactions, update the stored modified pending transaction by removing the executed modified pending transaction, or update the transaction graph by removing the transfer corresponding to the executed modified pending transaction.

Figure 7:
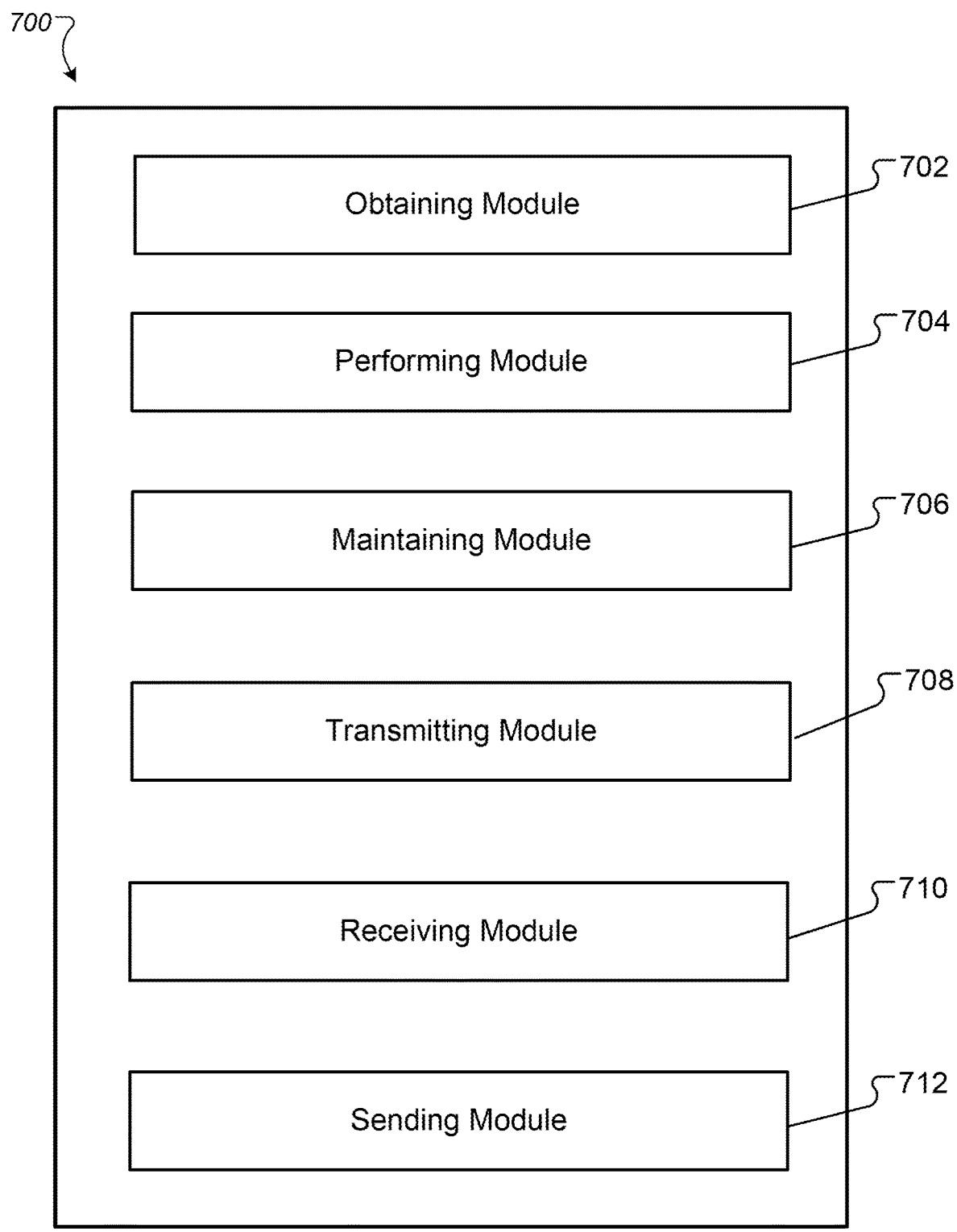
FIG. 7 depicts examples of modules of an apparatus in accordance with embodiments of this specification.

FIG. 7 depicts examples of modules of an apparatus 700 in accordance with embodiments of this specification. The apparatus 700 can be an example of an embodiment of a node of a blockchain network configured to manage transactions on the blockchain network. The apparatus 700 can correspond to the embodiments described above, and the apparatus 700 includes the following: an obtaining module 702 that obtains transaction data including a plurality of original pending transactions to be executed on the blockchain network among a plurality of accounts, the transaction data being stored on the blockchain network; a performing module 704 that performs a consolidation analysis of the plurality of original pending transactions to determine a plurality of modified pending transactions among the plurality of accounts, a number of the plurality of modified pending transactions being less than a number of the plurality of original pending transactions; and a maintaining module 706 that maintains the plurality of original pending transactions with the plurality of modified pending transactions, without updating the transaction data stored on the blockchain network with the plurality of modified pending transactions.

In an optional embodiment, the apparatus 700 can further include a transmitting module 708 that transmits a request to a settlement account management (SAM) server to execute at least one of the plurality of modified pending transactions associated with a particular account of the plurality of accounts; a receiving module 710 that receives from the SAM server a confirmation indicating that the at least one of the plurality of modified pending transactions associated with the particular account has been executed; and a sending module 712 that sends a settlement entry to the blockchain network, the settlement entry specifying that the at least one of the plurality of modified pending transactions associated with the particular account has been executed.

In an optional embodiment, the settlement entry is stored on the blockchain network together with the plurality of original pending transactions. The settlement information associated with the particular account can be verified on the blockchain network based on the settlement entry and the plurality of original pending transactions.

In an optional embodiment, the apparatus 700 further includes an obtaining module for obtaining from the client device a query requesting settlement information for the particular account associated with one or more of the plurality of original pending transactions. The apparatus 700 can further include a sending module for sending a consolidated settlement for the particular account of the plurality of accounts to the client device associated with the particular account in response to obtaining the query, the consolidated settlement being associated with at least one of the plurality of modified pending transactions associated with the particular account.

In an optional embodiment, the apparatus 700 further includes an obtaining module for obtaining a client request from the client device associated with the particular account, the client request authorizing settlement for the particular account, where the request is sent to the SAM server in response to obtaining the client request from the client device.

In an optional embodiment, the apparatus 700 further includes an updating module for updating the plurality of modified pending transactions based on the settlement entry specifying that the at least one of the plurality of modified pending transaction associated with the particular account has been executed, in response to receiving the confirmation from the SAM server.

In an optional embodiment, the apparatus 700 further includes a sending module for sending a message to a client device associated with the particular account, the message confirming that settlement associated with the particular account has been performed, in response to receiving the confirmation from the SAM server.

In an optional embodiment, the obtaining module 702 obtains the transaction data by synchronizing with the blockchain network to receive each of the plurality of original pending transactions from a respective client device associated with a respective account of the plurality of accounts.

In an optional embodiment, the performing module 704 performs the consolidation analysis of the plurality of original pending transactions to determine a plurality of modified pending transactions by calculating a respective consolidated settlement for each of the plurality of accounts based on the plurality of original pending transactions, grouping the plurality of accounts into a first group and a second group based on the respective consolidated settlements for the plurality of accounts, matching first accounts in the first group with second accounts in the second group according to the respective consolidated settlements for the first and second accounts, and generating the plurality of modified pending transactions based on a result of the matching.

In an optional embodiment, the performing module 704 performs the consolidation analysis of the plurality of original pending transactions to determine the plurality of modified pending transactions by presenting the plurality of original pending transactions on a transaction graph and determining the plurality of modified pending transactions by modifying the transaction graph, where the plurality of modified pending transactions is presented on a modified transaction graph.

In an optional embodiment, the maintaining module 706 reduces the modified transaction graph by removing the particular one of the plurality of modified pending transactions from the modified transaction graph, in response to determining that a particular one of the plurality of modified pending transactions has been executed.

The system, apparatus, module, or unit illustrated in the previous embodiments can be implemented by using a computer chip or an entity, or can be implemented by using a product having a certain function. A typical embodiment device is a computer (and the computer can be a personal computer), a laptop computer, a cellular phone, a camera phone, a smartphone, a personal digital assistant, a media player, a navigation device, an email receiving and sending device, a game console, a tablet computer, a wearable device, or any combination of these devices.

For an embodiment process of functions and roles of each module in the apparatus, references can be made to an embodiment process of corresponding steps in the previous method. Details are omitted here for simplicity.

Because an apparatus embodiment basically corresponds to a method embodiment, for related parts, references can be made to related descriptions in the method embodiment. The previously described apparatus embodiment is merely an example. The modules described as separate parts may or may not be physically separate, and parts displayed as modules may or may not be physical modules, may be located in one position, or may be distributed on a number of network modules. Some or all of the modules can be selected based on actual demands to achieve the objectives of the solutions of the specification. A person of ordinary skill in the art can understand and implement the embodiments of the present application without creative efforts.

Referring again to FIG. 7, it can be interpreted as illustrating an internal functional module and a structure of a blockchain-based transaction management implementation apparatus. The blockchain-based transaction management implementation apparatus can be an example of a blockchain network node configured to manage transactions in a blockchain network. An execution body in essence can be an electronic device, and the electronic device includes the following: one or more processors; and one or more computer-readable memories configured to store an executable instruction of the one or more processors. In some embodiments, the one or more computer-readable memories are coupled to the one or more processors and have programming instructions stored thereon that are executable by the one or more processors to perform algorithms, methods, functions, processes, flows, and procedures, as described in this specification.

The techniques described in this specification produce several technical effects. In some embodiments, the scheduler node can perform a consolidation analysis on original pending transactions to generate a less number of modified pending transactions and submit modified pending transactions associated with particular users to a settlement account management (SAM) server for settlement (or execution). The technologies can help reducing the number of actual settlement transactions such that the blockchain network can process a large volume of transactions while using blockchain technology to achieve trust to every user and integrity to each transaction.

In some embodiments, the scheduler node is a non-consensus node configured not to update transaction data stored in a blockchain on the blockchain network that includes the original pending transactions. This can avoid performing a consensus process on the blockchain network, thereby reducing operation costs and improving the efficiency of the blockchain network. Moreover, as the number of modified pending transactions is smaller than the original pending transactions, the number of actual settlement transactions is reduced and the number of settlement entries to be stored in the blockchain network is also reduced. This can also avoid increasing the storage space in the blockchain network.

The techniques enable to store the original pending transactions and/or settlement entries of actual settlement transactions in a blockchain on the blockchain network, thus the blockchain network can have a whole transaction graph for users (participants or accounts) in the blockchain network. Consensus nodes, e.g., customer bank nodes, associate with the users can store a complete copy of the blockchain. The blockchain network includes the scheduler node to perform the consolidation for the original pending transactions, meanwhile the blockchain network can achieve consensus from the users to maintain correct balance and perform each transaction in consolidated amount. The blockchain network can also provide verification services to the users by using the stored original pending transactions and settlement entries of the actual settlement transactions. Thus, the technologies can ensure balance correctness in distributed ledgers and provide trustable and provable transactions.

In some embodiments, the scheduler node is synchronized with the blockchain network to receive transfer requests from client devices associated with the users. Thus, the scheduler node can perform real-time and dynamic consolidation on the original pending transactions. The scheduler node can be also synchronized with the blockchain network to receive a settlement query and/or settlement request from a particular user. The scheduler node can response to the settlement query by providing consolidated settlement information to the particular user or to response to the settlement request by transmitting an SAM settlement request to the SAM server for executing at least one modified transaction associated with the particular user. Thus, the blockchain network can process a large volume of transactions dynamically and in a decentralized way.

In some embodiments, a scheduling application programming interface (API) can be provided to client devices associated with users. The client devices can use the scheduling API to send transfer requests, transfer queries, settlement queries, and/or settlement requests to nodes of the blockchain network. In some embodiments, a blockchain API can be provided to the nodes for reading/writing transaction entries and/or reading blocks. In some embodiments, a settlement integration API can be provided to an SAM server for receiving settlement requests and providing responses. These APIs can help reduce total transaction costs.

These technologies can be applied to blockchain payment networks or distributed payment networks, where the number of actual settlement transactions can be reduced and the credit-debit relationship can be preserved and endorsed by the blockchain technology. These technologies can be also applied to cross-border remittance, inter-institution money transfer, personal digital wallet, and valued-added service related to digital asset management.

Described embodiments of the subject matter can include one or more features, alone or in combination. For example, in a first embodiment, a method for managing transactions in a blockchain network includes: obtaining, by a scheduling device on the blockchain network, transaction data comprising a plurality of original pending transactions to be executed on the blockchain network among a plurality of accounts, the transaction data being stored on the blockchain network; performing, by the scheduling device, a consolidation analysis of the plurality of original pending transactions to determine a plurality of modified pending transactions among the plurality of accounts, wherein a number of the plurality of modified pending transactions is less than a number of the plurality of original pending transactions; and maintaining, by the scheduling device, the plurality of original pending transactions with the plurality of modified pending transactions, without updating the transaction data stored on the blockchain network with the plurality of modified pending transactions.

The foregoing and other described embodiments can each, optionally, include one or more of the following features:

A first feature, combinable with any of the following features, specifies that the method further includes: sending, by the scheduling device, a consolidated settlement for a particular account of the plurality of accounts to a client device associated with the particular account, the consolidated settlement being associated with at least one of the plurality of modified pending transactions associated with the particular account.

A second feature, combinable with any of the previous or following features, specifies that the method further includes: obtaining, by the scheduling device, a query from the client device, the query requesting settlement information for the particular account associated with one or more of the plurality of original pending transactions, wherein the consolidated settlement for the particular account is sent by the scheduling device in response to obtaining the query from the client device.

A third feature, combinable with any of the previous or following features, specifies that the method further includes: sending, by the scheduling device, a request to a settlement account management (SAM) server to execute at least one of the plurality of modified pending transactions associated with a particular account of the plurality of accounts.

A fourth feature, combinable with any of the previous or following features, specifies that the method further includes: obtaining, by the scheduling device, a client request from a client device associated with the particular account, the client request authorizing settlement for the particular account, wherein the request is sent to the SAM server in response to obtaining the client request from the client device.

A fifth feature, combinable with any of the previous or following features, specifies that the method further includes: receiving, by the scheduling device, a confirmation from the SAM server, the confirmation indicating that the at least one of the plurality of modified pending transactions associated with the particular account has been executed.

A sixth feature, combinable with any of the previous or following features, specifies that the method further includes: in response to receiving the confirmation from the SAM server, sending, by the scheduling device, a settlement entry to the blockchain network, the settlement entry specifying that the at least one of the plurality of modified pending transactions associated with the particular account has been executed.

A seventh feature, combinable with any of the previous or following features, specifies that the method further includes: storing, on the blockchain network, the settlement entry together with the plurality of original pending transactions.

An eighth feature, combinable with any of the previous or following features, specifies that the method further includes: verifying, on the blockchain network, settlement information associated with the particular account based on the settlement entry and the plurality of original pending transactions.

A ninth feature, combinable with any of the previous or following features, specifies that the method further includes: in response to receiving the confirmation from the SAM server, updating, by the scheduling device, the plurality of modified pending transactions based on a settlement entry specifying that the at least one of the plurality of modified pending transaction associated with the particular account has been executed.

A tenth feature, combinable with any of the previous or following features, specifies that the method further includes: in response to receiving the confirmation from the SAM server, sending, by the scheduling device, a message to a client device associated with the particular account, the message confirming that settlement associated with the particular account has been performed.

An eleventh feature, combinable with any of the previous or following features, specifies that performing a consolidation analysis of the plurality of original pending transactions to determine a plurality of modified pending transactions comprises: calculating a respective consolidated settlement for each of the plurality of accounts based on the plurality of original pending transactions; grouping the plurality of accounts into a first group and a second group based on the respective consolidated settlements for the plurality of accounts; matching first accounts in the first group with second accounts in the second group according to the respective consolidated settlements for the first and second accounts; and generating the plurality of modified pending transactions based on a result of the matching.

A twelfth feature, combinable with any of the previous or following features, specifies that performing a consolidation analysis of the plurality of original pending transactions to determine a plurality of modified pending transactions comprises: presenting the plurality of original pending transactions on a transaction graph; and determining the plurality of modified pending transactions by modifying the transaction graph, wherein the plurality of modified pending transactions is presented on a modified transaction graph.

A thirteenth feature, combinable with any of the previous or following features, specifies that maintaining the plurality of original pending transactions together with the plurality of modified pending transactions comprises: in response to determining that a particular one of the plurality of modified pending transactions has been executed, reducing the modified transaction graph by removing the particular one of the plurality of modified pending transactions from the modified transaction graph.

A fourteenth feature, combinable with any of the previous or following features, specifies that obtaining transaction data comprising a plurality of original pending transactions comprises: synchronizing with the blockchain network to receive each of the plurality of original pending transactions from a respective client device associated with a respective account of the plurality of accounts.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. For example, a computer program carrier can include one or more computer-readable storage media that have instructions encoded or stored thereon. The carrier may be a tangible non-transitory computer-readable medium, such as a magnetic, magneto optical, or optical disk, a solid state drive, a random access memory (RAM), a read-only memory (ROM), or other types of media. Alternatively, or in addition, the carrier may be an artificially generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

Processors for execution of a computer program include, by way of example, both general- and special-purpose microprocessors, and any one or more processors of any kind of digital computer. Generally, a processor will receive the instructions of the computer program for execution as well as data from a non-transitory computer-readable medium coupled to the processor.

The term "data processing apparatus" encompasses all kinds of apparatuses, devices, and machines for processing data, including by way of example a programmable processor, a computer, or multiple processors or computers. Data processing apparatus can include special-purpose logic circuitry, e.g., an FPGA (field programmable gate array), an ASIC (application specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

The processes and logic flows described in this specification can be performed by one or more computers or processors executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more storage devices. The storage devices can be, for example, magnetic, magneto optical, or optical disks, solid state drives, or any other type of non-transitory, computer-readable media. However, a computer need not have such devices. Thus, a computer may be coupled to one or more storage devices, such as, one or more memories, that are local and/or remote. For example, a computer can include one or more local memories that are integral components of the computer, or the computer can be coupled to one or more remote memories that are in a cloud network. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Components can be "coupled to" each other by being commutatively such as electrically or optically connected to one another, either directly or via one or more intermediate components. Components can also be "coupled to" each other if one of the components is integrated into the other. For example, a storage component that is integrated into a processor (e.g., an L2 cache component) is "coupled to" the processor.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific embodiment details, these should not be construed as limitations on the scope of what is being claimed, which is defined by the claims themselves, but rather as descriptions of features that may be specific to particular embodiments. Certain features that are described in this specification in the context of separate embodiments can also be realized in combination in a single embodiment. Conversely, various features that are described in the context of a single embodiments can also be realized in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for managing blockchain network transactions, the computer-implemented method comprising:
    storing transaction data in a blockchain by a consensus node of a blockchain network, wherein the transaction data comprise a plurality of first pending transactions to be executed on the blockchain network among a plurality of accounts, the blockchain network comprises the consensus node and a scheduling device, and the scheduling device is a non-consensus node of the blockchain network;
    obtaining the transaction data from the blockchain network by the scheduling device;
    determining a plurality of second pending transactions among the plurality of accounts by the scheduling device performing a consolidation analysis of the plurality of first pending transactions, wherein a number of the plurality of second pending transactions is less than a number of the plurality of first pending transactions;
    storing the plurality of first pending transactions with the plurality of second pending transactions locally by the scheduling device;
    obtaining a client request from a client device associated with an account of the plurality of accounts by the scheduling device, the client request authorizing a settlement for the account;
    sending a request to a settlement account management (SAM) server to execute at least one of the plurality of second pending transactions associated with the account by the scheduling device;
    receiving a confirmation from the SAM server by the scheduling device, the confirmation corresponding to an execution of the at least one of the plurality of second pending transactions;
    sending a settlement entry to the consensus node by the scheduling device, the settlement entry comprising information of the execution of the at least one of the plurality of second pending transactions; and
    storing the settlement entry in the blockchain by the consensus node.

wherein determining the plurality of second pending transactions by the scheduling device performing the consolidation analysis of the plurality of first pending transactions comprises:
  calculating a respective consolidated settlement for each of the plurality of accounts based on the plurality of first pending transactions;
  grouping the plurality of accounts into a debtor group and a creditor group based on respective consolidated settlements for the plurality of accounts;
  matching first accounts in the debtor group with second accounts in the creditor group according to respective consolidated debt settlements for the first accounts and respective consolidated credit settlements for the second accounts; and
  generating the plurality of second pending transactions based on a result of the matching.

2. The computer-implemented method of claim 1, further comprising:
  sending the settlement for the account of the plurality of accounts to the client device by the scheduling device, the settlement being associated with the at least one of the plurality of second pending transactions associated with the account.

3. The computer-implemented method of claim 2, further comprising:
  obtaining a query from the client device by the scheduling device, the query requesting settlement information for the account associated with one or more of the plurality of first pending transactions,
  wherein sending the settlement for the account is in response to obtaining the query from the client device.

4. The computer-implemented method of claim 1, wherein sending the settlement entry to the consensus node is in response to receiving the confirmation.

5. The computer-implemented method of claim 1, wherein storing the settlement entry in the blockchain by the consensus node comprises:
  storing the settlement entry together with the plurality of first pending transactions in the blockchain by the consensus node.

6. The computer-implemented method of claim 1, further comprising:
  verifying, settlement information based on the settlement entry and the plurality of first pending transactions by the consensus node.

7. The computer-implemented method of claim 1, further comprising:
  in response to receiving the confirmation, updating the plurality of second pending transactions based on the settlement entry by the scheduling device.

8. The computer-implemented method of claim 1, wherein determining the plurality of second pending transactions by performing the consolidation analysis of the plurality of first pending transactions comprises:
  presenting the plurality of first pending transactions on a transaction graph; and
  determining the plurality of second pending transactions by modifying the transaction graph, wherein the plurality of second pending transactions is presented on a modified transaction graph.

9. The computer-implemented method of claim 1, wherein obtaining the transaction data from the blockchain network comprises:
  receiving each of the plurality of first pending transactions from a respective client device associated with a respective account of the plurality of accounts by synchronizing with the blockchain network.

10. The computer-implemented method of claim 1, wherein the plurality of second pending transactions are not subject to a consensus process of the blockchain network to update the transaction data.

11. The computer-implemented method of claim 1, wherein determining the plurality of second pending transactions among the plurality of accounts comprises:
  determining the at least one of the plurality of second pending transactions associated with the account based on at least partially the one or more of the plurality of first pending transactions.

12. A system for managing blockchain network transactions, the system comprising:
  a blockchain network of a plurality of nodes that comprise:
    multiple consensus nodes; and
    a scheduling node configured to be a non-consensus node,
  wherein a consensus node of the multiple consensus nodes is configured to store transaction data in a blockchain, wherein the transaction data comprise a plurality of first pending transactions to be executed on the blockchain network among a plurality of accounts,
  wherein the scheduling node is configured to:
    obtain the transaction data from the blockchain network;
    perform a consolidation analysis of the plurality of first pending transactions to determine a plurality of second pending transactions among the plurality of accounts, wherein a number of the plurality of second pending transactions is less than a number of the plurality of first pending transactions;
    store the plurality of first pending transactions with the plurality of second pending transactions locally on the scheduling node;
    obtain a client request from a client device associated with an account of the plurality of accounts, the client request authorizing a settlement for the account;
    send a request to a settlement account management (SAM) server to execute at least one of the plurality of second pending transactions associated with the account, the SAM server being external to the blockchain network;
    receive a confirmation from the SAM server, the confirmation corresponding to an execution of the at least one of the plurality of second pending transactions; and
    send a settlement entry to the consensus node, the settlement entry comprising information of the execution of the at least one of the plurality of second pending transactions,
  wherein the scheduling node is configured to perform the consolidation analysis of the plurality of first pending transactions to determine the plurality of second pending transactions among the plurality of accounts by
    calculating a respective consolidated settlement for each of the plurality of accounts based on the plurality of first pending transactions;
    grouping the plurality of accounts into a debtor group and a creditor group based on respective consolidated settlements for the plurality of accounts;

matching first accounts in the debtor group with second accounts in the creditor group according to respective consolidated debt settlements for the first accounts and respective consolidated credit settlements for the second accounts; and generating the plurality of second pending transactions based on a result of the matching, and wherein the consensus node is configured to store the settlement entry in the blockchain.

13. The system of claim 12, wherein the system further comprises the SAM server.

14. The system of claim 12, wherein the scheduling node is configured to:

obtain a query from the client device, the query requesting settlement information for the account, the account being associated with one or more of the plurality of first pending transactions.

15. The system of claim 14, wherein the scheduling node is configured to:

in response to obtaining the query from the client device, send the settlement for the account to the client device, the settlement being associated with the at least one of the plurality of second pending transactions associated with the account.

16. The system of claim 12, wherein the scheduling node is configured to send the settlement entry to the consensus node in response to receiving the confirmation from the SAM server.

17. The system of claim 12, wherein the consensus node is configured to:

store the settlement entry together with the plurality of first pending transactions in the blockchain.

18. The system of claim 12, wherein the consensus node is configured to:

verify settlement information based on the settlement entry and the plurality of first pending transactions.

19. The system of claim 12, wherein the scheduling node is configured to:

in response to receiving the confirmation, update the plurality of second pending transactions based on the settlement entry.

20. The system of claim 12, wherein the scheduling node is configured to perform the consolidation analysis of the plurality of first pending transactions by presenting the plurality of first pending transactions on a transaction graph; and determining the plurality of second pending transactions by modifying the transaction graph, wherein the plurality of second pending transactions is presented on a modified transaction graph.

21. The system of claim 12, wherein the scheduling node is configured to:

determine the at least one of the plurality of second pending transactions associated with the account based on at least partially the one or more of the plurality of first pending transactions.

22. The system of claim 12, wherein the scheduling node is configured to obtain the transaction data by receiving each of the plurality of first pending transactions from a respective client device associated with a respective account of the plurality of accounts by synchronizing with the blockchain network.

23. The system of claim 12, wherein the scheduling node is configured not to provide the plurality of second pending transactions to a consensus process of the blockchain network to update the transaction data on the consensus node.

24. The system of claim 12, further comprising a scheduling application programming interface (API), wherein client devices associated with the plurality of accounts are configured to communicate with the blockchain network via the scheduling API.

25. The system of claim 12, further comprising a blockchain application programming interface (API), wherein the consensus node is configured to store the transaction data in the blockchain through a consensus process via the blockchain API.

26. The system of claim 25, wherein the scheduling node is configured to synchronize with the blockchain API to obtain the transaction data.

27. The system of claim 12, further comprising a settlement integration application programming interface (API), wherein the SAM server is configured to communicate with the scheduling node via the settlement integration API.

28. An apparatus, comprising:

one or more processors; and one or more non-transitory machine readable storage media coupled to the one or more processors and having machine-executable instructions stored thereon that, when executed by the one or more processors, cause the one or more processors to perform operations comprising:

obtaining transaction data in a blockchain of a blockchain network, wherein the transaction data is stored by a consensus node of the blockchain network in the blockchain, the transaction data comprising a plurality of first pending transactions to be executed on the blockchain network among a plurality of accounts;

determining a plurality of second pending transactions among the plurality of accounts by performing a consolidation analysis of the plurality of first pending transactions, wherein a number of the plurality of second pending transactions is less than a number of the plurality of first pending transactions;

locally storing the plurality of first pending transactions with the plurality of second pending transactions, wherein the plurality of second pending transactions are not subject to a consensus process of the blockchain network to update the transaction data on the consensus node;

obtaining a client request from a client device associated with an account of the plurality of accounts, the client request authorizing a settlement for the account;

sending a request to a settlement account management (SAM) server to execute at least one of the plurality of second pending transactions associated with the account;

receiving a confirmation from the SAM server, the confirmation corresponding to an execution of the at least one of the plurality of second pending transactions; and sending a settlement entry to the consensus node for storing in the blockchain, the settlement entry comprising information of the execution of the at least one of the plurality of second pending transactions, wherein determining the plurality of second pending transactions among the plurality of accounts by performing the consolidation analysis of the plurality of first pending transactions comprises:

calculating a respective consolidated settlement for each of the plurality of accounts based on the plurality of first pending transactions;

grouping the plurality of accounts into a debtor group and a creditor group based on respective consolidated settlements for the plurality of accounts;

matching first accounts in the debtor group with second accounts in the creditor group according to respective consolidated debt settlements for the first accounts and respective consolidated credit settlements for the second accounts; and generating the plurality of second pending transactions based on a result of the matching.

29. The computer-implemented method of claim 1, wherein each of the plurality of second pending transactions is between a different corresponding pair of accounts among the plurality of accounts, and wherein each of the plurality of accounts is in a single pair of accounts that is associated with a different corresponding second pending transaction of the plurality of second pending transactions.

* * * * *